United States Patent
DeVlieg et al.

(10) Patent No.: US 7,954,910 B2
(45) Date of Patent: *Jun. 7, 2011

(54) METHOD TO REDUCE CARBON BRAKE WEAR THROUGH RESIDUAL BRAKE FORCE

(75) Inventors: Gary DeVlieg, Bellevue, WA (US); John Gowan, Edmonds, WA (US)

(73) Assignee: Hydro-Aire, Inc., Subsidiary of Crane Co., Burbank, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 12/209,945

(22) Filed: Sep. 12, 2008

(65) Prior Publication Data

US 2009/0184571 A1    Jul. 23, 2009

Related U.S. Application Data

(63) Continuation of application No. 11/061,375, filed on Feb. 18, 2005, now Pat. No. 7,441,844.

(51) Int. Cl.
*B60T 8/86* (2006.01)
(52) U.S. Cl. .......................... 303/126; 303/20
(58) Field of Classification Search .................. 303/126, 303/20, 191; 244/111, 110 A; 188/1.11 R, 188/1.11 E
See application file for complete search history.

(56) References Cited

U.S. PATENT DOCUMENTS

| | | | |
|---|---|---|---|
| 3,948,569 A | 4/1976 | Genter et al. | |
| 4,043,607 A | 8/1977 | Signorelli et al. | |
| 4,234,063 A | 11/1980 | Blake | |
| 4,364,610 A | 12/1982 | Williams | |
| 4,367,529 A | 1/1983 | Masclet et al. | |
| 4,367,903 A | 1/1983 | Worbois | |
| 4,610,484 A | 9/1986 | Amberg et al. | |
| 4,613,190 A | 9/1986 | Johnson | |
| 4,923,056 A | 5/1990 | Nedelk | |
| 4,986,610 A | 1/1991 | Beck et al. | |
| 4,995,483 A | 2/1991 | Moseley et al. | |
| 5,024,491 A | 6/1991 | Pease, Jr. et al. | |
| 5,050,940 A | 9/1991 | Bedford et al. | |
| 5,172,960 A | 12/1992 | Chareire | |
| 5,217,282 A | 6/1993 | Guichard | |
| 5,417,477 A | 5/1995 | Lasbleis | |
| 5,505,531 A | 4/1996 | Griffith et al. | |
| 5,845,975 A | 12/1998 | Wells | |
| 6,036,285 A | 3/2000 | Murphy | |
| 6,308,807 B1 | 10/2001 | Matsumoto et al. | |
| 6,398,162 B1 | 6/2002 | Stimson et al. | |
| 6,416,141 B1 | 7/2002 | Zinnkann et al. | |
| 6,478,252 B1 | 11/2002 | Stimson et al. | |
| 6,604,708 B1 | 8/2003 | DeVlieg | |
| 6,659,233 B2 | 12/2003 | DeVlieg | |
| 6,722,745 B2 | 4/2004 | Salamat et al. | |

(Continued)

FOREIGN PATENT DOCUMENTS

EP    0329373 A1    8/1989

(Continued)

*Primary Examiner* — Robert A Siconolfi
*Assistant Examiner* — Mariano Sy
(74) *Attorney, Agent, or Firm* — Fulwider Patton LLP

(57) ABSTRACT

The method for reducing aircraft carbon brake wear involves monitoring the commanded initiation of braking, and setting a residual brake clamping force to a predetermined minimum residual brake clamping force, which is maintained following the commanded initiation of braking to prevent release of braking during taxiing of the aircraft. The minimum residual brake clamping force is applied despite a commanded release of braking until at least one predetermined control logic condition occurs.

14 Claims, 2 Drawing Sheets

U.S. PATENT DOCUMENTS

| | | |
|---|---|---|
| 6,851,649 B1 | 2/2005 | Radford |
| 6,954,692 B2 | 10/2005 | Dellac et al. |
| 7,410,224 B2 | 8/2008 | DeVlieg et al. |
| 7,441,844 B2 | 10/2008 | DeVlieg et al. |
| 7,735,938 B2 | 6/2010 | DeVlieg et al. |
| 7,789,469 B2 | 9/2010 | DeVlieg et al. |
| 2004/0011596 A1 | 1/2004 | Miller et al. |
| 2005/0082999 A1 | 4/2005 | Ether |
| 2005/0104446 A1 | 5/2005 | Chico et al. |
| 2005/0231030 A1 | 10/2005 | Frank |
| 2009/0184571 A1 | 7/2009 | DeVlieg et al. |

FOREIGN PATENT DOCUMENTS

| | | |
|---|---|---|
| EP | 0384071 A1 | 8/1990 |
| EP | 0443213 A2 | 8/1991 |

METHOD TO REDUCE CARBON BRAKE WEAR THROUGH RESIDUAL BRAKE FORCE

CROSS-REFERENCES TO RELATED APPLICATIONS

This application is a continuation of U.S. patent application Ser. No. 11/061,375, filed on 18 Feb. 2005, which is now U.S. Pat. No. 7,441,844, which is hereby incorporated by reference as if set forth in full herein.

BACKGROUND OF THE INVENTION

1. Field of the Invention

This invention relates to a method for reducing brake wear of carbon brakes for aircraft, and more particularly relates to a method for reducing brake wear of aircraft carbon brakes by maintaining a light residual clamping force of the carbon brakes when braking is no longer commanded, to prevent release of the carbon brakes, without otherwise affecting normal braking.

2. General Background and State of the Art

Commercial aircraft commonly have landing gear with carbon brakes for wheels mounted to the wing and body of the aircraft. The carbon brakes typically include a torque plate and a carbon heat sink stack containing the friction surfaces that are clamped together with a clamping brake force to cause a wheel to decrease its speed of rotation. In such a conventional airplane carbon brake system, when braking is commanded, either by a pilot's actuation of a brake pedal or automatic braking, it causes the friction surfaces of the carbon brakes to make contact, creating brake torque to slow down the rotational speed of the wheel, and through contact with the ground, the taxi speed of airplane. When a release of braking is commanded, such as when the pilot discontinues the brake pedal command, the brake friction surfaces move apart and a layer of carbon falls away. The amount of wear of airplane carbon brakes is thus directly influenced by the number of brake applications, and is not significantly affected by the level of braking effort or intensity during braking. A gradual and small braking stop will cause approximately as much carbon brake wear as a sudden hard stop.

One conventional technique that was developed for reducing wear of an airplane having multiple wheels with carbon brakes, known as brake disabling, selective operation, or as taxi-brake select, involves the application of less than the total number of available brakes during taxiing of the airplane, and consequently the selective disabling of some of the brakes during taxiing. In this technique, different selections of brakes may be disabled for different stages of taxiing and for specific aircraft conditions. However, in order to control taxi speed and turning of an airplane multiple brake applications or "snubs" of low brake intensity still may be required, so that it would be desirable to provide a method of reducing the number of releases of aircraft carbon brakes once the aircraft carbon brakes have been applied when an airplane is taxiing, in order to reduce brake wear. The present invention satisfies this and other needs.

SUMMARY OF THE INVENTION

Briefly, and in general terms, the invention provides for a method for reducing brake wear of aircraft carbon brakes, once braking has been commenced, by maintaining a minimum light residual clamping brake force when braking is no longer commanded, such as when a pilot stops pressing on a brake pedal, or otherwise during a commanded release of braking during automatic braking. A full brake release can be warranted by one or more control logic conditions. Normal additional brake applications or snubs required to control taxi speed or turning of the aircraft are not affected by maintaining a minimum light residual clamping brake force when the airplane is taxiing, and by this method of brake control the friction surfaces of carbon brakes will wear less, since the number of applications can be greatly reduced.

The present invention accordingly provides for a method for controlling carbon brakes of an aircraft having a plurality of wheels and a corresponding plurality of wheel brakes for the plurality of wheels to reduce brake wear. The commanded initiation of braking of any of the plurality of wheel brakes of the aircraft is monitored, and a residual brake clamping force is set to a predetermined minimum residual brake clamping force for the plurality of wheel brakes in response to the commanded initiation of braking. The predetermined minimum residual brake clamping force is typically about 1 to 10 percent of the maximum brake clamping force of the brake, and is currently preferably about 2 to 5 percent of the maximum brake clamping force of the brake. The predetermined minimum residual brake clamping force is applied to the plurality of wheel brakes despite a commanded release of braking of any of the plurality of wheel brakes. In a presently preferred aspect, this application of at least the predetermined minimum residual brake clamping force is continued until at least one predetermined control logic condition occurs, in response to which the application of the predetermined minimum residual brake clamping force is discontinued.

In one currently preferred aspect, the predetermined minimum residual brake clamping force is discontinued by setting the residual brake clamping force to a "full dump" or substantially zero clamping force, so that the residual brake clamping force would continue to be a "full dump" or substantially zero clamping force until the next commanded initiation of braking.

One presently preferred control logic condition under which the application of the predetermined minimum residual brake clamping force is discontinued exists when the average wheel speed is below a predetermined threshold, such as a range of about 2 to 10 knots, for example.

Typically an aircraft has left and right landing gear. If desired, the average wheel speed of both the left and right landing gear may optionally be determined independently. The average wheel speeds of the left and right landing gear will be compared, and the lesser of the two average wheel speeds will be used to compare with the predetermined wheel speed threshold. When an aircraft has left and right landing gear, the predetermined minimum residual brake clamping force will be discontinued if the lesser of the two average wheel speeds is below the wheel speed threshold. The average wheel speed for each landing gear is calculated independently, so that when the airplane is turning and the inboard landing gear wheel speed is below the wheel speed threshold, the predetermined minimum residual brake clamping force will be discontinued.

If desired, hysteresis can be incorporated into the wheel speed logic, such that once the wheel speed control logic condition has been met and the predetermined minimum residual brake clamping force has been discontinued, the predetermined minimum residual brake clamping force would not be applied upon the next commanded initiation of braking unless the aircraft first reaches a higher ground speed, such as 15 knots, for example, but the aircraft would again discontinue the predetermined minimum residual brake clamping force when the aircraft average wheel speed is below a lower speed, such as 2 knots, for example.

Another presently preferred control logic condition under which the application of the predetermined minimum residual brake clamping force is discontinued exists when any engine thrust lever is advanced. Engine thrust lever position may also be monitored to determine the pilot's intent to accelerate the airplane for takeoff or to begin taxi. If the predetermined minimum residual brake clamping force has been applied, the predetermined minimum residual brake clamping force will be discontinued if any engine thrust lever is detected to be in an "advanced" position. As an alternative to monitoring of engine thrust lever position, an equivalent control logic condition under which the application of the predetermined minimum residual brake clamping force can be discontinued exists when wheel speed acceleration exceeds a preset threshold, since when the thrust levers are applied for takeoff, the wheel speed acceleration is quite significant and can be easily detected to positively inhibit any brake drag during takeoff.

Another optional control logic condition under which the application of the predetermined minimum residual brake clamping force could be discontinued is if the brake temperature increases above a predetermined temperature threshold. Another optional control logic condition under which the application of the predetermined minimum residual brake clamping force could be discontinued exists when the distance the aircraft has rolled with a predetermined minimum residual brake drag applied has exceeded a distance threshold. The roll distance traveled can be determined by using wheel speed data and measuring the time since the last brake application command. Once the roll distance has increased above a set threshold, such as two miles, for example, the predetermined minimum residual brake clamping force will be discontinued to prevent the brakes from becoming hotter.

The invention accordingly also provides for a system for controlling carbon brakes of an aircraft having a plurality of wheels and a corresponding plurality of wheel brakes for the plurality of wheels to reduce brake wear when the aircraft is taxiing. The system includes means for monitoring commanded initiation of braking of any of the plurality of wheel brakes of the aircraft, and means for setting a residual brake clamping force to a predetermined minimum residual brake clamping force for the plurality of wheel brakes in response to the commanded initiation of braking of any of the plurality of wheel brakes. The system also includes means for applying the predetermined minimum residual brake clamping force to the plurality of wheel brakes despite a commanded release of braking of any of the plurality of wheel brakes.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
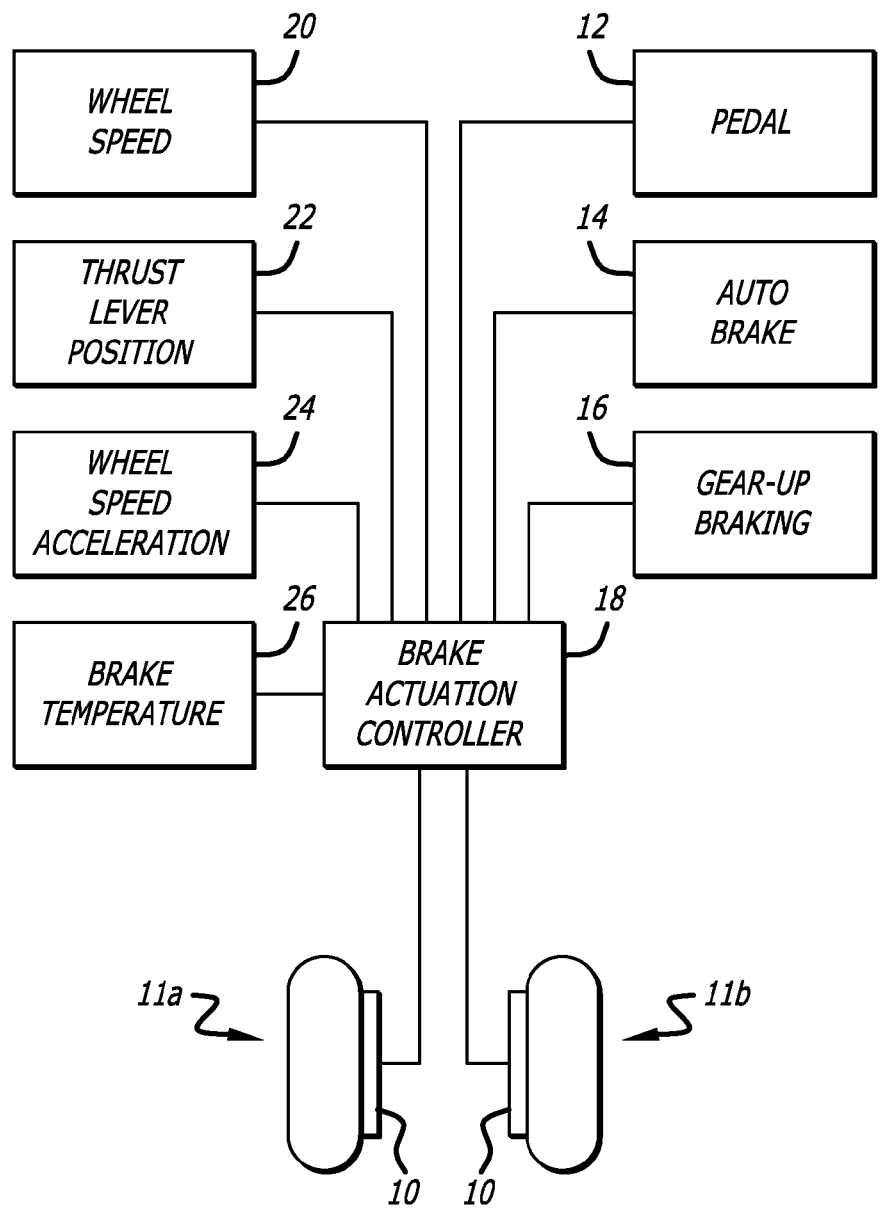
FIG. 1 is a schematic diagram of a system for controlling carbon brakes of an aircraft, according to the present invention.

Referring to the drawings, which are provided for purposes of illustration and by way of example, the present invention provides for a method for controlling carbon brakes of an aircraft having a plurality of wheels and a corresponding plurality of wheel brakes for the plurality of wheels to reduce brake wear when the aircraft is taxiing. The method according to the invention reduces brake wear by maintaining a residual minimum brake application clamping force after commanded braking has been initiated, as well as after the pilot has released the brake pedal following a brake application. This is done so that the number of brake applications is reduced, since the friction surfaces never leave contact with one another between pilot brake applications. When a pilot actuates a brake pedal with this minimum residual brake force enabled, normal braking will not be affected. The residual brake force is set each time after the brakes are applied, and is then removed if one or more logic conditions exists, such as when the average wheel speed is below a predetermined threshold, whether any engine thrust lever is advanced, when the brake temperature increases above a threshold, or when the distance rolled with residual brake drag applied exceeds a specified limit. However, since multiple brake snubs are commonly required to counteract the force of the aircraft engine thrust during taxiing, applying a minimum residual brake force will act in an equivalent manner to counteract the force of the aircraft engine thrust, and will also reduce the number of brake snubs necessary to control the taxi speed, so that applying the minimum residual brake force over a long distance will not tend to heat the aircraft carbon brakes abnormally. By maintaining contact of the carbon brake friction surfaces when an airplane is taxiing except when such a control logic condition exists, the friction surfaces will wear less, since the number of carbon brake applications is reduced.

As is illustrated in FIG. 1, according to the method and system of the invention, the commanded initiation of braking of any of the plurality of wheel brakes 10 of an aircraft, such as by actuation of brake pedal 12 by a pilot, an autobrake system 14, or gear-up braking system 16, for example, is monitored by a brake actuation controller 18, and a residual brake clamping force is set to a predetermined minimum residual brake clamping force by the brake actuation controller to keep the brakes engaged and provide a slight drag for the plurality of wheel brakes following the commanded initiation of braking. The predetermined minimum residual brake clamping force is typically set to about 1 to 10 percent of the maximum brake clamping force of the brake, and in a currently preferred aspect, is set to about 2 to 5 percent of the maximum brake clamping force of the brake.

Figure 2:
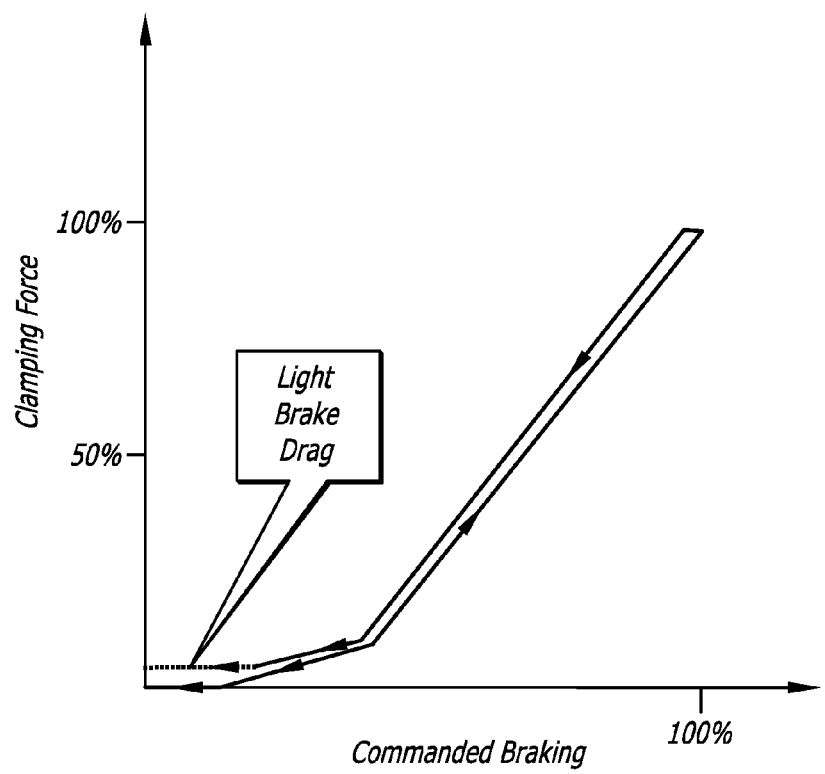
FIG. 2 is a graph illustrating the application of brake clamping force vs. commanded brake application according to the present invention.

Once the residual minimum brake clamping force is engaged, it is maintained for the plurality of wheel brakes despite a commanded release of braking, such as by actuation of brake pedal by a pilot, an autobrake system, or gear-up braking system, for example, of any of the plurality of wheel brakes. The application of the predetermined minimum residual brake clamping force is continued until one or more control logic conditions occurs, in response to which the application of the predetermined minimum residual brake clamping force is discontinued. In a preferred aspect, the predetermined minimum residual brake clamping force is discontinued by setting the residual brake clamping force to a "full dump" or substantially zero clamping force, so that the residual brake clamping force would continue to be a "full dump" or substantially zero clamping force until the brakes are applied again in the next commanded initiation of braking. As is illustrated in FIG. 2, application of the predetermined minimum residual brake clamping force is maintained after commanded release of braking results in a light brake drag during taxiing of an airplane.

Referring to FIG. 1, wheel speed monitors 20 for the wheels of the aircraft provide the wheel speed of the landing gear to the brake actuation controller, which determines the average wheel speed and compares the average wheel speed with a wheel speed threshold. A primary control logic condition under which the application of the predetermined minimum residual brake clamping force is discontinued occurs when the average wheel speed is below the predetermined wheel speed threshold, which in one presently preferred aspect is a wheel speed in a range of about 2 knots to about 10 knots, for example, in order to ensure full brake release during towing/push-back.

Typically when an aircraft has left landing gear 11a and right landing gear 11b, the average wheel speed of both the left and right landing gear may optionally be determined independently. The average wheel speeds of the left and right landing gear will be compared, and the lesser of the two average wheel speeds will be used to compare with the predetermined wheel speed threshold. The average wheel speed for each landing gear can be calculated independently in this manner so that when the airplane is turning and the inboard landing gear wheel speed is below the wheel speed threshold, the predetermined minimum residual brake clamping force will be discontinued.

In this control logic condition, when an aircraft has left and right landing gear, the predetermined minimum residual brake clamping force will be discontinued if the lesser of the two average wheel speeds is below the wheel speed threshold. The average wheel speed for each landing gear is calculated independently, so that when the airplane is turning and the inboard landing gear wheel speed is below the wheel speed threshold, the predetermined minimum residual brake clamping force will be discontinued. Disabling the brake drag force below a threshold will also ensure that the feature will not interfere with airplane towing operations, which typically happen at low speed. The brakes will also be fully released when the airplane is full stop. This will ensure that the brake drag will not interfere with parking brake operation, when maintenance personnel must replace the wheel/brake, during brake-released cooling on the ground, or during system checkout testing. Finally, disabling the brake drag force below a speed threshold will ensure that the brakes are released when stowed in the wheel well and prior to touchdown/wheel spin up.

In another presently preferred aspect, a hysteresis can be incorporated into the wheel speed logic, such that once the wheel speed control logic condition has been met and the predetermined minimum residual brake clamping force has been discontinued, the predetermined minimum residual brake clamping force would not be applied upon the next commanded initiation of braking unless the aircraft first reaches a higher ground speed, such as 15 knots, for example, but the aircraft would again discontinue the predetermined minimum residual brake clamping force when the aircraft average wheel speed is below a lower speed, such as 2 knots, for example.

Engine thrust lever position may optionally be monitored to determine the pilot's intent to accelerate the airplane for takeoff or to begin taxi. An engine thrust lever position monitor 22 detects when any engine thrust lever is in an "advanced" position. If the predetermined minimum residual brake clamping force has been applied, the predetermined minimum residual brake clamping force will be discontinued if an engine thrust lever is detected to be in an "advanced" position. Once thrust levers are not in an "advanced" state, residual brake drag will be enabled after the pilot has subsequently depressed the brake pedal.

When the thrust levers are applied for takeoff, the wheel speed acceleration is quite significant and can be easily detected to positively inhibit any brake drag during takeoff. Therefore, optionally, a wheel speed acceleration monitor 24 can be provided to detect acceleration of the airplane for takeoff or taxiing, and as an alternative to monitoring of engine thrust lever position. The brake actuation controller can compare the wheel speed acceleration with a predetermined acceleration threshold, and application of the predetermined minimum residual brake clamping force may be discontinued if wheel speed acceleration beyond the preset acceleration threshold.

The brake temperature monitor system 26 may also be used to provide brake temperature readings to the brake actuation controller to compare with a predetermined temperature threshold, so that the application of the predetermined minimum residual brake clamping force can optionally be discontinued if the brake temperature increases above the temperature threshold. This way the residual brake force will not cause the brake temperature to become too high. Once the brake temperature is above the temperature threshold, carbon brake wear is already reduced because carbon brake wear rates are known to be less at high temperature.

Another optional control logic condition under which the application of the predetermined minimum residual brake clamping force could be discontinued can occur if the distance the aircraft has rolled with a predetermined minimum residual brake drag applied has exceeded a distance threshold. The roll distance traveled can be determined by the brake actuation controller by using data from the wheel speed monitor and tracking the time since the last brake application command. Once the roll distance has increased above a set threshold, such as two miles, for example, the predetermined minimum residual brake clamping force will be discontinued to prevent the brakes from becoming hotter.

Examples of circumstances in which one or more of the control logic conditions should ideally apply to interrupt application of predetermined minimum residual brake application clamping force include: during towing and push-back, so that the tow tractor doesn't have to cope with the brake drag; during touchdown/wheel spin up; during antiskid cycling when full dumps are commanded; on the outboard gear during tight turns, since release of the residual drag may be desirable so that the brakes don't fight the turn; with the landing gear stowed, which may be desirable for cooling the landing gear in the wheel well; and when parked with the parking brake released, which also may be desirable for brake cooling. Typically for such circumstances as touchdown, spin up, and during antiskid cycling, an antiskid system already overrides metered braking pressure. While for tight turns it may also be desirable to optionally implement a steering control logic condition by monitoring steering or tiller position, this would normally not be necessary, since typically release of the predetermined minimum residual brake clamping force would already take place when any such tight turns might occur, due to the monitoring of wheel speed as a control logic condition. During turns, the speed of the wheels on the inboard side of the turn will travel more slowly than those on the outboard side, and the differential will become greater as the turn gets tighter. The effect of the wheel speed logic would be to remove the "slight drag" virtually any time the aircraft makes a tight turn, thereby reducing the differential thrust required to make the turn.

Although it is also possible to optionally monitor stowing of the landing gear and parking, due to monitoring of wheel speed, release of the predetermined minimum residual brake clamping force would normally take place when the landing gear is stowed or the airplane is parked, due to the control logic that releases the brakes below a wheel speed threshold. It should also be noted that brake release commands from an antiskid control system always override any brake application command, i.e., a full release from the antiskid control system will always result in full release of the brake application clamping force.

The result for various phases of operation is as follows:

Parked at the ramp: Brakes will fully release (wheel speed below 2 to 10 knots).

Pushback: Brakes will fully release (wheel speed below 2 to 10 knots).

Very slow taxi (below 2 to 10 knots): Brakes will fully release (wheel speed below 2 to 10 knots).

Normal taxi (above 2 to 10 knots): Brakes will fully release until first brake snub, and then brakes will gently "ride."

Tight turns: Brakes will fully release (tight turns require slow speed, inboard-gear wheel speed below 2 to 10 knots).

Takeoff roll:
(a) Normal operation: Brakes will fully release (thrust levers advanced).
(b) Abnormal operation: For RTO with sufficient braking to induce antiskid action, brakes will fully release until 1st brake application. Then brakes will fully release whenever antiskid commands it. If antiskid doesn't command full release then brakes will gently "ride".

Liftoff: Brakes will fully release (thrust levers advanced).

Gear retract: Brakes apply due to gear retract braking, then fully release when gear retract braking command is removed (wheel speed below 2 to 10 knots).

Stowage in wheel well: Brakes will fully release (wheel speed below 2 to 10 knots).

Gear extension before touchdown: Brakes will fully release (wheel speed below 2 to 10 knots).

Touchdown/spin up (pedals not applied):
Normal operation: Brakes will fully release (brakes not re-applied since wheel speed below 2-10 knots).
Abnormal operation: Touch down/spin up with pedals applied, brakes will fully release (touchdown/hydroplane protection already resident in antiskid).

Landing rollout, either manual or automatic braking (no antiskid action):
Normal operation: Brakes will fully release until 1st brake application. Then brakes will gently "ride".
Abnormal operation: Landing rollout with sufficient braking to induce antiskid action, brakes will fully release until 1st brake application. Then brakes will fully release whenever antiskid commands it. If antiskid doesn't command full release then brakes will gently "ride."

Taxi in (above 2 to 10 knots): Brakes will fully release until 1st brake snub. Then brakes will gently "ride."

Final maneuvering and docking (below 2 to 10 knots): Brakes will fully release (wheel speed below 2 to 10 knots).

Setting the parking brake, then releasing: Brakes will fully release (wheel speed below 2 to 10 knots).

Operation with hot brakes: Brakes will fully release at all times (hot brakes per brake temp monitor).

Figure 3:
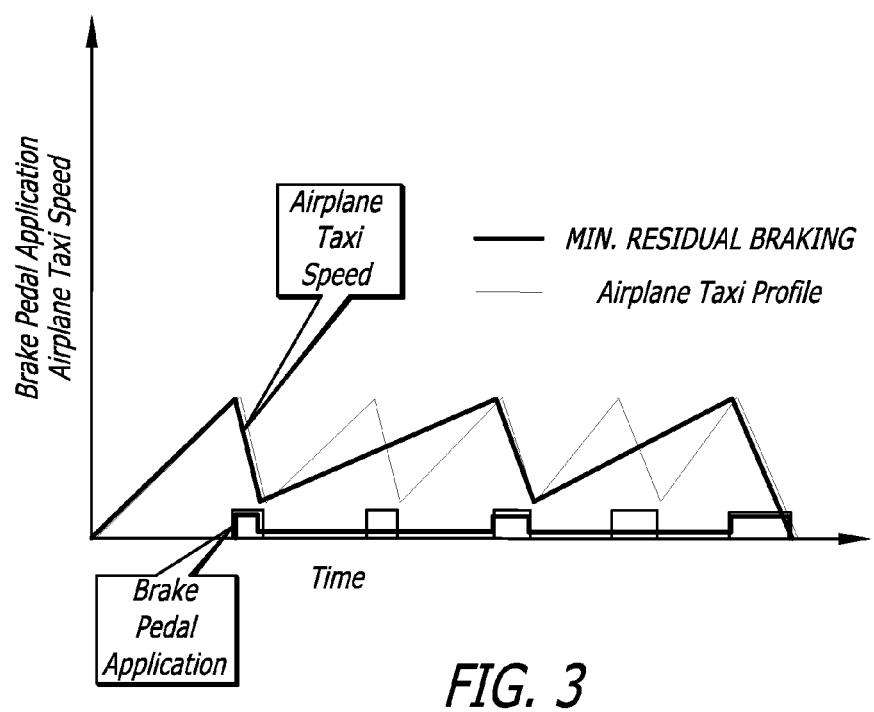
FIG. 3 is a graph illustrating brake applications and airplane taxi speed vs. time during taxiing of an airplane implementing the method of the present invention.

As is illustrated in FIG. 3, the overall brake energy for brake energy for normal braking with multiple brake snubs is substantially equivalent to controlling application of aircraft carbon brakes according to the invention, but the number of taxi brake applications is reduced from five brake applications using normal braking, to one braking application by the method of the invention. It should be apparent that the number of taxi brake applications thus can be substantially reduced by the method of the invention, resulting in significantly reduced aircraft carbon brake wear.

It will be apparent from the foregoing that, while particular forms of the invention have been illustrated and described, various modifications can be made without departing from the spirit and scope of the invention. Accordingly, it is not intended that the invention be limited, except as by the appended claims.

The invention claimed is:

1. A method for controlling carbon brakes of an aircraft during taxiing of the aircraft, the aircraft having a left landing gear and a right landing gear, said left and right landing gear having a plurality of wheels and a corresponding plurality of wheel brakes for the plurality of wheels, comprising the steps of:
monitoring commanded initiation of braking of any of the plurality of wheel brakes of the aircraft;
setting a residual brake clamping force to a predetermined minimum residual brake clamping force for the plurality of wheel brakes in response to said commanded initiation of braking of any of the plurality of wheel brakes;
applying said predetermined minimum residual brake clamping force simultaneously to all of the plurality of wheel brakes despite a commanded release of braking of any of the plurality of wheel brakes;
determining an average wheel speed of the left landing gear;
determining an average wheel speed of the right landing gear;
comparing said average wheel speed of the left landing gear and said average wheel speed of the right landing gear and determining a lesser of the average wheel speeds of the left and right landing gear;
comparing the lesser of the average wheel speeds of the left and right landing gear with a predetermined wheel speed threshold; and
discontinuing said predetermined minimum residual brake clamping force when said lesser of the average wheel speeds of the left and right landing gear is below said predetermined wheel speed threshold.

2. The method of claim 1, wherein said predetermined wheel speed threshold is in the range of about 2 knots to about 15 knots.

3. The method of claim 1, wherein said predetermined wheel speed threshold is in the range of about 2 knots to about 10 knots.

4. The method of claim 1, wherein said aircraft includes at least one engine thrust lever, further comprising the steps of:
monitoring engine thrust lever position; and
discontinuing said predetermined minimum residual brake clamping force when said at least one engine thrust lever is in an advanced position.

5. The method of claim 1, further comprising the steps of:
detecting wheel speed acceleration;
comparing said wheel speed acceleration with a predetermined acceleration threshold; and
discontinuing said predetermined minimum residual brake clamping force when said wheel speed acceleration exceeds said acceleration threshold.

6. The method of claim 1 further comprising the steps of:
monitoring temperature of said plurality of wheel brakes;

comparing said temperature of said plurality of wheel brakes with a temperature threshold; and discontinuing said predetermined minimum residual brake clamping force when said temperature of said plurality of wheel brakes exceeds said temperature threshold.

7. The method of claim 1, further comprising the steps of:

determining distance rolled with said predetermined minimum residual brake clamping force applied;

comparing said distance rolled with a predetermined distance threshold; and discontinuing said predetermined minimum residual brake clamping force when said distance rolled exceeds said predetermined distance threshold.

8. The method of claim 1, wherein said predetermined minimum residual brake clamping force comprises about 1 to 10% of a maximum brake clamping force of said plurality of wheel brakes.

9. The method of claim 1, wherein said predetermined minimum residual brake clamping force comprises about 2 to 5 percent of a maximum brake clamping force of said plurality of wheel brakes.

10. The method of claim 1, wherein said step of discontinuing said predetermined minimum residual brake clamping force comprises setting said residual brake clamping force to zero.

11. A system for controlling carbon brakes of an aircraft during taxiing of the aircraft, the aircraft having a left landing gear and a right landing gear, said left and right landing gear having a plurality of wheels and a corresponding plurality of wheel brakes for the plurality of wheels, the system comprising:

means for monitoring commanded initiation of braking of any of the plurality of wheel brakes of the aircraft;

means for setting a residual brake clamping force to a predetermined minimum residual brake clamping force for all of the plurality of wheel brakes only in response to the commanded initiation of braking of any of the plurality of wheel brakes; and means for applying the predetermined minimum residual brake clamping force simultaneously to all of the plurality of wheel brakes despite a commanded release of braking of any of the plurality of wheel brakes;

means for determining an average wheel speed of the left landing gear;

means for determining an average wheel speed of the right landing gear;

means for comparing said average wheel speed of the left landing gear and said average wheel speed of the right landing gear and determining a lesser of the average wheel speeds of the left and right landing gear;

means for comparing the lesser of the average wheel speeds of the left and right landing gear with a predetermined wheel speed threshold; and means for discontinuing said predetermined minimum residual brake clamping force when said lesser of the average wheel speeds of the left and right landing gear is below said predetermined wheel speed threshold.

12. The system of claim 11, wherein said aircraft includes at least one engine thrust lever, and further comprising:

means for monitoring engine thrust lever position; and means for discontinuing said predetermined minimum residual brake clamping force when said at least one engine thrust lever is in an advanced position.

13. The system of claim 11, further comprising:

means for detecting wheel speed acceleration;

means for comparing said wheel speed acceleration with a predetermined acceleration threshold; and means for discontinuing said predetermined minimum residual brake clamping force when said wheel speed acceleration exceeds said acceleration threshold.

14. The system of claim 11, further comprising:

means for monitoring temperature of said plurality of wheel brakes;

means for comparing said temperature of said plurality of wheel brakes with a temperature threshold; and means for discontinuing said predetermined minimum residual brake clamping force when said temperature of said plurality of wheel brakes exceeds said temperature threshold.

\* \* \* \* \*